United States Patent Office 3,776,853
Patented Dec. 4, 1973

3,776,853
DRY-CLEANING COMPOSITION AND METHOD
Herbert F. Minter, Pittsburgh, and James D. B. Smith, Turtle Creek, Pa., assignors to Westinghouse Electric Corporation, Pittsburgh, Pa.
No Drawing. Filed Aug. 19, 1971, Ser. No. 173,231
Int. Cl. C11d 7/52
U.S. Cl. 252—171                                     10 Claims

ABSTRACT OF THE DISCLOSURE

Filter clogging in dry-cleaning machines is reduced and filter life is extended by using a dry-cleaning solvent containing a flocculant. A dry-cleaning composition is disclosed which comprises a dry-cleaning solvent, about 50 to 1000 p.p.m. flocculant, and about 0.1 to 2% detergent.

BACKGROUND OF THE INVENTION

After a dry-cleaning machine washes a fabric in a dry-cleaning fluid, it circulates the fluid through a filter usually containing a core of activated carbon, to remove suspended particles. After a number of cleaning cycles the filter becomes clogged with particles which decrease the flow rate of the solvent through the filter and increase the pressure drop across the filter, eventually necessitating the replacement of the filter for efficient cleaning.

Some dry-cleaning machines automatically backwash (i.e. reverse the solvent flow) at the end of each cycle which may increase the number of cycles somewhat before the filter must be replaced. Even then the activated carbon core of the filter may retain 50% of its absorption activity and therefore must be discarded prematurely.

While it is possible that polymers similar to the flocculants of this invention have bee dissolved in dry-cleaning solvents such as tetrachloroethane in the course of various processes unrelated to dry cleaning, the concentrations used would very likely far exceed the concentrations of this invention.

ADVANTAGES OF THE INVENTION

Our invention significantly reduces the clogging of filters in dry-cleaning machines and thereby greatly extends their life. In doing so, the invention keeps the flow rate through the filters higher than it otherwise would be and the pressure drop across the filters lower than it would otherwise be, which increases the effectiveness of the cleaning process and puts less strain on the machine. Also, the still-utilizable carbon core which was previously discarded prematurely is no longer wasted. The invention may be used with almost every type of filter including paper, synthetic fibers, wire mesh, felt pad, pleated wool felt, etc., and with almost every type of dry-cleaning machine including large commercial machines and small coin-operated machines. This is accomplished by introducing a fluocculant into the dry-cleaning fluid. The use of the flocculant does not adversely affect the cleaning efficacy of the machine nor of the detergent.

SUMMARY OF THE INVENTION

We have discovered that the clogging of filters is due to the penetration and migration into the filter of very small suspended particles, usually less than $5\mu$ in size, and that the addition of an organic polyelectrolytic flocculant which is soluble in the dry-cleaning solvent substantially reduces the amount of clogging, most probably be agglomerating these small particles into particles which are too large to penetrate the filter medium. These larger particles can then be brushed off the filter or washed off during the backwash, thereby greatly extending the filter life. A composition of a dry-cleaning solvent, a flocculant, and a detergent may be prepared which obtains the benefits of this invention.

DESCRIPTION OF THE INVENTION

In the method of this invention a fluocculant is added to the dry-cleaning solvent before it is circulated through the filter. The optimum or maximum amount of the flocculant may be added in its entirety initially or it may be added in a series of steps, one addition every washing cycle or every few washing cycles. Preferably, a prepared dry-cleaning solvent which already contains the flocculant is used as this avoids such operator errors as failure to add the flocculant or the addition of excess flocculant. It is also preferable that the solvent be backwashed through the filter after each washing cycle to remove the particles from the surface of the filter, although removal of the particles may also be accomplished by mechanical scraping or flexure of the filter.

THE FLOCCULANT

The flocculants of this invention are organic polyelectrolytes (positive, negative or amphoteric) which are soluble in the dry-cleaning fluid. While the degree of solubility necessary will depend upon the particular flocculant and solvent, generally if a flocculant is soluble to the extent of 100 p.p.m. in perchloroethylene at ambient temperatures it will function satisfactorily. The molecular weight (herein this means number average) will also depend on the particular flocculant and solvent, but polycondensation products should have a molecular weight of at least 500 while vinyl derivatives should have a molecular weight of at least 10,000 and preferably at least 50,000 for optimum flocculating ability.

Polyacrylic acid, polyacrylamide, polymethacrylic acid, and polymethacrylamide (examples of vinyl derivative compounds) are the outstanding flocculants as they are inexpensive, very soluble in dry-cleaning fluids, and function very effectively in preventing clogging; of the four, polyacrylic acid is preferred for its excellent anti-clogging activity. These flocculants preferably have a molecular weight of about 10,000 to 100,000.

Examples of other suitable flocculants include soluble compounds of the following: polymers of vinylpyridine, vinylpyrrolidone, aminoacrylates, and ethyleneimines, copolymers of styrene and vinyl chloride, copolymers of acrylic acid or methacrylic acid and styrene or vinyl chloride, copolymers of acrylic acid and acrylonitrile, copolymers of melamine, guanidine, urea and formaldehyde, hydrolyzed maleic acid-styrene copolymers (50 to 80 mol. percent styrene), sulfonated polystyrene, aminated polymers of parachloro methylstyrene, polymers of alpha-chloro methylstyrene, aminated copolymers of styrene and vinyl chloride, the condensation products of alkylene dichlorides and alkylene polyamines, and the reaction product of starch and chloro-ethylamine. Two or more of these flocculants may be employed in practicing the invention. A mixture of both a positive and a negative flocculant will produce particularly good results.

THE SOLVENT

The solvent, which may be described as aprotic (i.e. having no mobile protons), is preferably perchloroethylene (also known as tetrachloroethylene) as it is nonflammable and most commonly used. Trichloroethylene, tetrachloroethane, trichloroethane, dichloroethane, dichloropropane, chloroform, various aliphatic hydrocarbons from $C_{12}$ to $C_{20}$, Stoddard solvent (a petroleum distillate), 140° F. solvent (a petroleum distillate having a flash point of 140° F.), and the chloro-fluorohydrocarbons (such as trichlorotrifluoroethane) having boiling points of 50 to 200° C. sold under the Du Pont Co. "Freon" trademark, may also be used. Mixtures of two or more of these solvents may be prepared and used.

THE DETERGENT

The detergent is a surfactant which is soluble in the dry-cleaning fluid and is most commonly a sulfonated or phosphated organic compound. A detergent which is soluble to the extent of at least about 100 p.p.m. at ambient temperatures in perchloroethylene is generally suitable.

The preferred detergents are amine or alkali metal salts of an alkylarenesulfonic acid as they are widely used and work well. Examples of other suitable detergents include soaps and fatty acid mixtures, petroleum sulfonate (a sulfonate of mixed hydrocarbons of petroleum origin), sodium sulfosuccinates, fatty acid esters of sorbitan, ethoxylates, alkanolamides, ethoxylated phenols, ethoxylated phosphate esters, sulfonated alkylaryl polyether alcohols, and sodium heptadecyl sulfates. Mixtures of two or more detergents may be employed.

THE COMPOSITIONS

The dry-cleaning compositions according to this invention comprise a dry-cleaning solvent, a flocculant, and a detergent. The flocculant may be at concentration of about 150 to about 1000 p.p.m. of the dry-cleaning fluid, the optimum concentration depending on the particular flocculant and the type of soil in the particular area. For most flocculants less than about 250 p.p.m. is insufficient to flocculate substantially all of the soil particles present and more than about 550 p.p.m. is unnecessary and wasteful.

The detergent concentration is about 0.1% to about 2% (all percentages herein are by weight), but a preferred range is from 0.8 to 1.2% since at less than about 0.8% the detergent tends to become ineffective and more than 1.2% is usually unnecessary and may cause foaming and deposits on the fabrics.

The following example further illustrates this invention:

Example 1

From a coin-operated dry-cleaning establishment in Mansfield, Ohio, which used "PER-CS" detergent (a Dow Chemical Co. trademark for nonyl-phenoxy poly (ethyleneoxy) ethanol) was obtained a used commercial filter cartridge. This cartridge consisted of a perforated metal core surrounded by granular activated carbon, pleated filter paper, and an outer perforated metal container. The cartridge was dismantled and the parts weighed and compared to an unused cartridge. The weight difference was 1172 gms.

Examination of the filter paper of the cartridge disclosed an outer layer of large clumps of fibrous lint which was easily loosened. Immediately in contact with the paper was a layer of small particles which could only be removed with a considerable amount of scraping. Microscopic examination of this inner layer indicated that these small particles, less than about $5\mu$ in diameter, had penetrated almost ⅔ of the way through the paper and were blocking most of the pores.

A sample of soil from the cartridge was ball-milled for 24 hours to break up the coagulated particles. Four samples of 10 gms. of soil in 200 gms. perchloroethylene were prepared, three containing a flocculant (polyacrylic acid—10,000 to 100,000 mol. wt. sold by Swift Chemical Co. under the trademark "XPA") and one a detergent (Dow "PER-CS"). Each sample was stirred rapidly for two minutes with a glass rod and the time required for a clear separation into solid and liquid phases to occur was measured. The following table gives the results:

| No. | Detergent, percent | Flocculant, p.p.m. | Separation time, min. | Comments |
|---|---|---|---|---|
| 1 | | | >15 | Fibrous lint floats on top of solvent, fines settle to bottom of beaker. |
| 2 | | 100 | >15 | Do. |
| 3 | | 300 | 3 to 5 | Very clear separation of solvent from soil, no material left on bottom of beaker. |
| 4 | 1.0 | 250 | 4 to 5 | Do. |

The table indicates that the flocculant became effective between 100 and 250 p.p.m. and was not affected by the presence of the detergent.

Example 2

The following table gives examples of three dry-cleaning compositions useful in decreasing the clogging of filters by soil in dry-cleaning machines:

| Solvent | Detergent | Flocculant |
|---|---|---|
| Trichloroethylene. | 1.2% nonyl-phenoxy poly (ethyleneoxy) ethanol. | 400 p.p.m. polyacrylic acid (50,000 mol. wt.). |
| Perchloroethylene. | 0.8% ethoxylated phenol. | 350 p.p.m. polyacrylamide (75,000-100,000 mol. wt.). |
| Do. | 1.0% sulfonated alkylaryl polyether alcohol. | 400 p.p.m. polymethacrylic acid (75,000-100,000 mol. wt.). |
| Do. | | 200 p.p.m. polyacrylamide (75,000 mol. wt.). 200 p.p.m. polyacrylic acid (75,000 mol. wt.). |

Example 3

A perchloroethylene solvent containing an initial 0.9% ethoxylated phenol detergent and 50 p.p.m. polyacrylic acid (50,000 mol. wt.) is used in a commercial dry-cleaning machine to reduce filter clogging by soil particles. After every 25 washing cycles another 50 p.p.m. flocculant and 0.9% detergent is added.

Example 4

To reduce filter clogging, a commercial dry-cleaning machine is operated with Stoddard solvent initially containing 60 p.p.m. polymethacrylamide (75,000 mol. wt.) and 1.0% petroleum sulfonate. After every 20 washing cycles an additional 60 p.p.m. polymethacrylamide and 1.0% petroleum sulfonate is added.

We claim:

1. A dry-cleaning composition consisting essentially of a dry-cleaning solvent and about 150 to about 1000 p.p.m. of a mixture of a positive, soluble, organic, polyelectrolytic flocculant and a negative, soluble, organic, polyelectrolytic fluocculant.

2. A dry-cleaning composition according to claim 1 wherein the concentration of said mixture is about 250 to about 550 p.p.m.

3. A composition according to claim 9 wherein the concentration of said detergent is about 0.8 to about 1.2%.

4. A composition according to claim 1 wherein said mixture is selected from flocculants of the group consisting of polyacrylic acid, polyacrylamide, polymethacrylic acid, and polymethacrylamide, which have molecular weights of about 10,000 to about 100,000.

5. A composition according to claim 9 wherein said detergent is an amine or alkali metal salt of an alkylarenesulfonic acid.

6. In a dry-cleaning machine where a fabric is washed with a solvent which is continually or periodically passed through a filter in order to remove suspended particles during cleaning operations, a method of decreasing the clogging of said filter by said suspended particles comprising adding a mixture of a positive, soluble, organic, polyelectrolytic flocculant and a negative, soluble, organic, polyelectrolytic flocculant to said solvent and maintaining the concentration of said mixture in said solvent as said solvent is used to wash said fabric at about 150 to about 1000 p.p.m.

7. A method according to claim 6 wherein said mixture is selected from flocculants of the group consisting of polyacrylic acid, polyacrylamide, polymethacrylic acid, and polymethacrylamide, which have molecular weights of about 10,000 to about 100,000.

8. A method according to claim 6 including the additional step of backwashing said solvent through said filter after each washing cycle.

9. A composition according to claim 1 which includes about 0.1 to about 2% of an anionic, synthetic, organic detergent.

10. A composition according to claim 1 wherein said solvent is perchloroethylene.

References Cited
UNITED STATES PATENTS

| | | | |
|---|---|---|---|
| 3,505,005 | 4/1970 | Gilbert | 8—142 |
| 3,085,916 | 4/1963 | Zimmie et al. | 252—DIG. 2 |
| 3,215,680 | 11/1965 | Kolodny | 252—DIG. 2 |
| 3,563,902 | 2/1971 | Schmadel et al. | 252—DIG. 2 |
| 3,421,835 | 1/1969 | McCarty | 8—142 |

WILLIAM E. SCHULZ, Primary Examiner

U.S. Cl. X.R.

8—142